UNITED STATES PATENT OFFICE.

MAX B. MAYER, OF SAN ANTONIO, TEXAS.

WATERPROOFING COMPOSITION AND PROCESS OF MAKING THE SAME.

1,326,079. Specification of Letters Patent. Patented Dec. 23, 1919.

No Drawing. Application filed May 28, 1918. Serial No. 237,132.

*To all whom it may concern:*

Be it known that I, MAX B. MAYER, a citizen of the United States, residing at San Antonio, in the county of Bexar and State of Texas, have invented certain new and useful Improvements in Waterproofing Compositions and Processes of Making the Same, of which the following is a specification.

This invention relates to improvements in waterproofing composition and to a novel process of producing the same.

The object of my present invention is the production of a soluble composition which when reduced to or while in its fluid state is applicable to fabrics or other articles for the purpose primarily of rendering them waterproof, and, secondarily, of preserving the life of the article treated.

My composition consists of an admixture of wax in solution constituting a coating substance and filler, with a suitable binder or adhesive which when subjected to my process of compounding results in the elimination of certain inherent and undesirable characteristics of the individual ingredients that have rendered the substances ineffective, or not sufficiently effective under all conditions of use, as regards their waterproofing and preserving properties.

Further objects are to produce a composition of the above character which will not only not be deleterious to fabric to which it is applied even though it be of the most delicate nature, but which will impregnate as well as coat the surface of such fabric to thereby render it impervious to moisture; and to produce a waterproof substance which will withstand the extremes of heat and cold and furthermore preserve the pliability of the fabric treated.

The composition consists preferably of a mixture of vegetable wax, (for example candelilla wax), an animal wax (beeswax), and a mineral wax (paraffin), with resin, in about the following proportions:

| | |
|---|---|
| Candelilla wax | 12 parts, |
| Beeswax | 12 " |
| Paraffin | 69 " |
| Resin | 7 " |

I wish it to be here understood that I do not confine myself to the use of any particular one of the various resins, though I prefer to use what is commercially known as rosin, in the carrying out of my process. Rosin, however, is not the only one of the resins which will accomplish the desired result, and hence the foregoing statement.

As the first step of my process I heat the paraffin sufficiently to bring the same to a boil. The candelilla wax, having been already melted in a steam jacketed kettle, is next added to the boiling paraffin and the combined solution allowed to cool to a temperature of substantially 145° F. The adding of the candelilla wax is performed slowly.

The remaining ingredients of my composition, the resin and beeswax, are melted separately and after being cooled to the same temperature as the combined paraffin and wax solution first described, are added to said solution. All of the various ingredients of my composition having thus been brought together are now slowly cooked until there are no indications of oil, bubbles or fatty acids upon the surface of the solution. This step of my process is of primary importance to obtaining the highest efficiency for my composition because any impurities such as the oil and fatty acids must be removed from the surface of the liquid as they are created in the cooking operation. This may be done in any conventional manner and by any conventional utensil.

The combined solution having been cooked in the manner described and until the impurities are eliminated according to the process set forth, may be permitted to cool.

In the practical application of my composition to fabrics intended to be treated therewith the solution may be applied either in hot or warm state. Heating of the substance of course renders the same a fluid easily applied by means of a common brush or by dipping of the fabric therein. I have ascertained that mixing of warm gasolene with my solution enables excellent results to be achieved in so far as efficient waterproofing action is concerned.

It is notable that the several ingredients of my composition have different melting points, this being an especial feature of advantage owing to the fact that the mixture resulting from combining the said ingredients is capable of withstanding a very wide range of temperature changes without deterioration of the compound in any material way.

The several waxes included in my composition obviously form an effective body or filler therefor, while the resin is a correspondingly effective binder or adhesive and the several waxes, as previously suggested, are not affected by ordinary heat or cold variations, something which constitutes a defect in the usefulness of so-called waterproofing coatings made from common waxes.

In usage the substance is designed to be applicable to any fabric or texture, cheese cloth included, and it will fill the pores of the fabric as well as coat the surface thereof and thus make it absolutely waterproof. It has a wide range of utility inasmuch as it may be applied to waterproof tentage, wagon covers, duck coverings of any kind exposed to the weather, cotton fabrics used as coverings, cement sacks, salt sacks, sugar sacks, corn and other sacks, paste-board or card-board containers, corrugated boxes, and veneering of all kinds.

The particular advantages of my compositions are that the ingredients when prepared in accordance with my process fill in the pores of the fabric as well as coat the surface of the same and thus make completely waterproof the article treated but without injuring the texture of the fabric which is, on the contrary, preserved by the substance since said substance is freed from all mineral matter, acid or oils. Furthermore, I claim that the action of candelilla wax when mixed in accordnace with the process takes the brittleness out of the wax and allows it to become pliable after dilution with the mixture of beeswax and resin as indicated above.

Having thus described my invention, what I claim as new is:—

1. A waterproofing compound consisting of approximately 93 per cent. of wax and an adhesive substance having a materially higher melting point.

2. A waterproofing composition consisting of an admixture of vegetable, mineral and animal waxes freed substantially of mineral matter, fatty acids and oils.

3. A waterproofing composition consisting of an admixture of vegetable, mineral and animal waxes freed substantially of mineral matter, fatty acids and oils, and an adhesive binder.

4. A waterproofing composition consisting of candelilla wax, beeswax, paraffin, and a resin.

5. A waterproofing composition consisting of approximately twelve parts of candelilla wax, twelve parts of beeswax, sixty-nine parts of paraffin, and seven parts of a resin.

6. The process of manufacturing waterproofing composition which consists in heating wax until melted and adding thereto while heating an adhesive binding substance and cooking the admixture to separate the impurities.

7. The process of manufacturing waterproofing composition which consists in heating wax until melted, adding thereto while heating an adhesive binding substance, and removing from the mixture impurities and foreign matter appearing on the surface before allowing to cool.

8. The process of manufacturing waterproofing composition which consists in boiling paraffin and candelilla wax and adding thereto during heating a resinous solution.

9. The process of manufacturing waterproofing composition which consists in boiling paraffin and candelilla wax, adding thereto during heating a resinous solution, cooking the mixture slowly to extract oil and impurities, and finally removing such oil and impurities therefrom.

10. The process of manufacturing waterproofing composition which consists in bringing paraffin to a boil and slowly adding thereto candelilla wax, allowing the mixture to cool, and adding thereto before cold a mixture of resin and beeswax.

11. The process of manufacturing waterproofing composition which consists in bringing paraffin to a boil and slowly adding thereto candelilla wax, allowing the mixture to cool, adding thereto before cold a mixture of resin and beeswax, cooking the complete mixture and removing impurities appearing on the surface during the cooking process.

12. The process of manufacturing waterproofing composition which consists in bringing paraffin to a boil, slowly adding dissolved candelilla wax and allowing the solution to cool, then melting resin and beeswax and adding the same to the paraffin and candelilla wax, and cooking the admixture until no oil bubbles or fatty acids appear on the surface.

13. The process of manufacturing waterproofing compound which consists in bringing paraffin to a boil, slowly adding candelilla wax previously dissolved, and allowing the mixture to cool to approximately 145° F., then melting resin and beeswax separately and allowing the same to cool to approximately the temperature of the paraffin and candelilla wax, then adding the resin and beeswax to the paraffin and candelilla wax, cooking the admixture and finally removing impurities from the surface during the cooking process.

In testimony whereof I affix my signature.

MAX B. MAYER.